United States Patent [19]

Yang

[11] Patent Number: 4,804,163
[45] Date of Patent: Feb. 14, 1989

[54] KEY BUTTON TYPE OF WATER TAP

[76] Inventor: Shun-Ching Yang, 202-20, Hou-Pi Tsun, Jen Te Hsiang, Tainan Hsien, Taiwan

[21] Appl. No.: 192,747

[22] Filed: May 10, 1988

[51] Int. Cl.$^4$ .................... F16K 31/44; F16K 31/53
[52] U.S. Cl. .................... 251/74; 137/460; 137/513.7; 137/517; 251/116; 251/118
[58] Field of Search .................... 137/460, 461, 513.7, 137/517; 251/66, 74, 114, 115, 116, 118, 120, 127

[56] References Cited

U.S. PATENT DOCUMENTS

| | | | |
|---|---|---|---|
| 1,322,076 | 11/1919 | Wheaton | 251/66 |
| 1,329,209 | 1/1920 | Riccio | 251/66 |
| 2,643,678 | 6/1953 | Paradise | 251/74 |
| 2,906,286 | 9/1959 | Hanscom | 137/460 |
| 3,317,184 | 5/1967 | Usry | 251/118 |
| 3,768,507 | 10/1973 | Dicken, Jr. | 137/517 |
| 3,802,459 | 4/1974 | Geraudie | 251/74 |
| 3,870,077 | 3/1975 | Nakamura | 251/120 |
| 3,877,524 | 4/1975 | Glenn, Jr. | 137/460 |
| 4,079,750 | 3/1978 | Ludwig | 137/513.7 |
| 4,307,746 | 12/1981 | Rifat | 251/116 |

FOREIGN PATENT DOCUMENTS 703329  4/1931  France ................. 251/116

Primary Examiner—George L. Walton
Attorney, Agent, or Firm—Varndell Legal Group

[57] ABSTRACT

The present invention relates to a key button type of water tap, wherein a pressing mode is being employed to establish a non-step positioning as a means to determine the moving downward of depth of the sharp body of a circular awl installed inside the valve gate mechanism to regulate the quantity of water which flows out. At the same time, if one wants to stop the water from flowing out, just slightly press the upper cap to cause the stop body to move away from the gang gear of the key rod. The key button rod will move upward in an instance to cause the valve gate mechanism to close, so as to immediately stop the water from flowing out.

4 Claims, 3 Drawing Sheets

4,804,163

KEY BUTTON TYPE OF WATER TAP

BACKGROUND AND SUMMARY OF THE INVENTION

A most commonly seen water tap is of a turning type of control, the defect of which lies in the turning process being applied as a means to control the quantity of water being flowed out. In a similar manner, the same process also has to be applied to close the water tap. It is frequently negligent for people to turn the tap tightly at the time of turning and hence will result in the leaking of water. Moreover, due to the excessive force being applied to turning the tap, it is rather easy to cause the deformity of the water cushion ring which is fixed in the interior of the water tap and thus brings damage to its proper functioning. Therefore, the forementioned turning type of water taps will often produce difficulties to the mechanic at the time of repair and maintenance that makes it quite inefficient in its operation.

The present invention pertains to a key button type of water tap, particularly denoting the one in which a non-step positioning can be processed at will to control the quantity of water which flows out, wherein a key button rod from the botton end of which the awl cap is being extended to press against the awl cap of the valve gate mechanism, which will, at the time of the moving downward of the key button rod, caused the housing body which is being extended from the stop body to be housed into any position which lies in the interior of the gang gear set by the key button rod. The forementioned position may be decided by the operator to facilitate the control of the quantity of water which flows out. Similarly, the sharp body of the circular awl which joined to the awl cap will, at the same time, also move downward and start to open the valve gate. If one wants to prevent the water from flowing out, all he has to do is to press the upper cap tightly because it is being tightly screwed to the two section type of bolt sleeve being extended upward from the recoil body which is of a slanting plane design housed inside the recoil groove of the recoil body. At the same time, a compression spring is set in the space between the upper cap and the top stand. Therefore, when the upper is moving downward, the stop body will be caused to conduct a left and right swinging motion to move away from the gang gear onto which it is housed, so as to further cause the key button rod to move upward to close the valve gate. At the same time, the upper cap will be instantly recoiled under the effect of the compression spring. The simplified design, easy operation and the easy application of force for the exertion of control without damaging the valve gate mechanism are considered to be the characteristics of the present invention.

DETAILED DESCRIPTION OF THE PREFERRED EMBODIMENT

Figure 1:
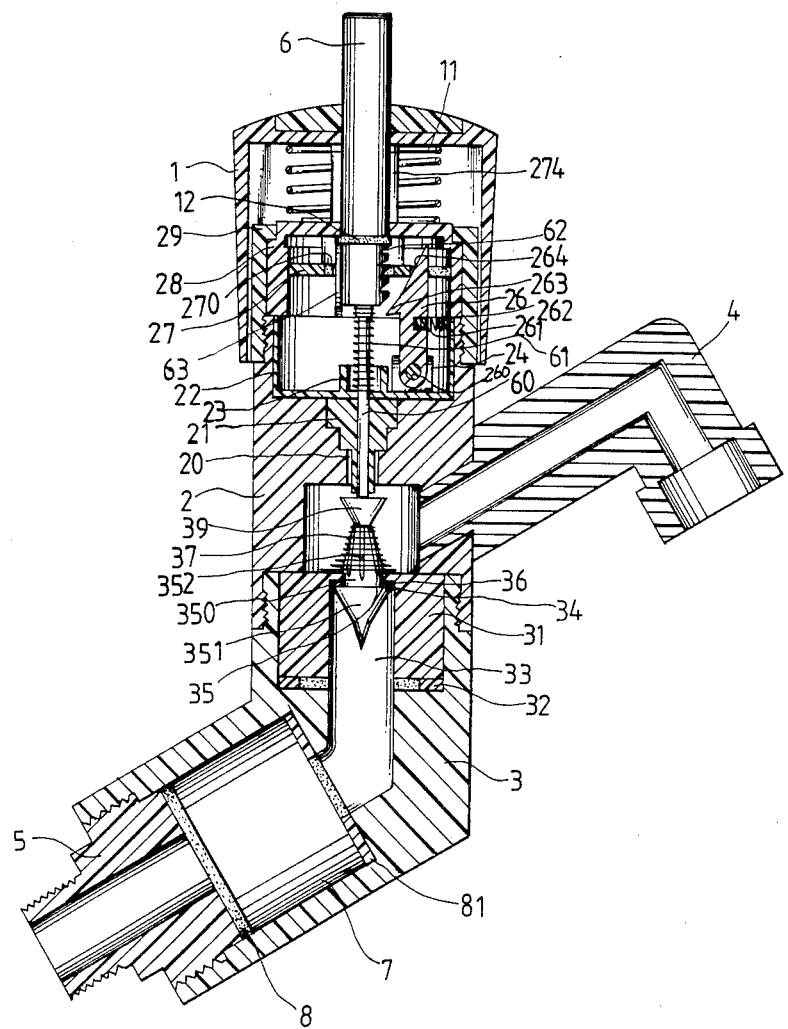
FIG. 1 is the cross-section view of the present invention.

Please refer to FIG. 1, wherein the key button type of water tap presented by the present invention comprises of an upper cap 1, a middle cylindrical body 2, a curved cylinder 3, a water outlet pipe 4 and a pipe connecting body 5.

Figure 4:
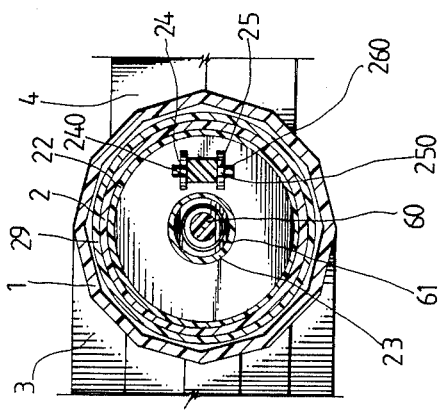
FIG. 4 is the looking downward view of the cross-section drawing of the middle cylindrical body of the present invention.
Figure 3:
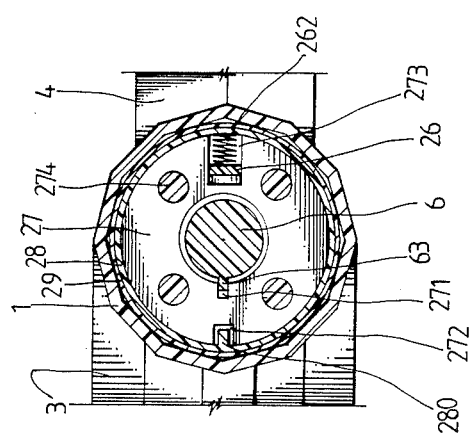
FIG. 3 is the looking downward view of the cross-section drawing of the top seat of the present invention.

As shown in FIG. 1 and FIG. 4, wherein each of the upper and lower direction of the middle cylindrical body 2 is having the setting of a space, at the central part of which a ladder-shaped groove 20 is set, into which a ladder-shaped cushion ring 21 can be housed as a means to prevent the flowing in of the water. A middle seat 22 can be housed into the upper space. A convex cylinder 23 is set at the central part of the formentioned middle seat 22. Positioning bodies 24, 25 are set at the right edge of the forementioned middle seat 22 into which a means is provided for the setting and fixing of opening grooves 240, 250 of the positioning body 24 of mandrel 260 through which the bottom end of the latch stop body 26 passed. Therefore, by means of using the mandrel 260 as a center, the latch stop body 26 can conduct a left and right swinging motion. Moreover, a circular groove aperture 261 is also set at the right edge of the formentioned stop body 26, into which a spring 262 is also housed to press against the interior wall plane of the middle seat 22. At the same time, the left edge of the stop body 26 is in the form of a triangular housing body 263 and its top edge is of a slanting plane 264 design. Then, a spring 61 is to be sleeved into the rod 60 which is being extended from the bottom end of the key button rod 6 to further pass through the middle seat 22 while the ladder-shaped cushion ring 21 will be projected at the lower space of the middle cylindrical body 2. As shown in FIG. 3, a circular aperture 270 is set at the central part of the recoil body 27 and a key groove 271 is also set at its left edge to enable the passing throught of the key button rod 6 and the convex key 63 which is attached to its left lateral side. Another opening groove 272 locating at its left side is being provided for the passing through and the fixing of the guiding body 280 of the top seat 28 to serve for the purpose of preventing the key button rod 6 and the recoil body 27 revolving at will. At the same time, four pieces of two-sectioned type of bolt sleeves 274 are extended from the recoil body 27, the upper part of which will extend out and rest on the top seat 28, while their lower part will press against the interior plane of top seat 28, which is functioned to keep the passing through of the stop body 26 into the opening groove 273 of recoil body 27 in a unified height. In this manner, when the recoil body 27 is moving excessively upward, the stop body 26 will be prevented from moving away from the opening groove 273 when it is being pressed against by the spring 262 and thus loss its squeezing/fixing function. The formentioned top seat 28 will be tightly screwed onto the upper end of the middle cylindrical body 2 when the top seat 28 is being pressed against by the top cap 29.

Figure 2:
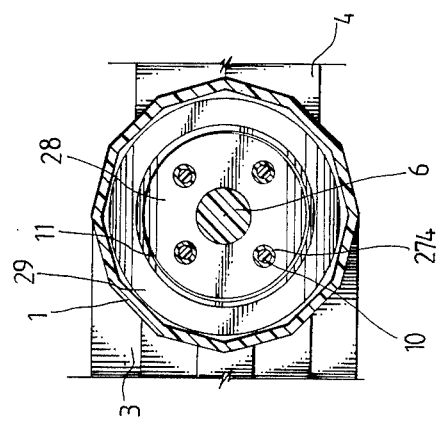
FIG. 2 is the looking downward view of the cross-section drawing of the upper cap of the present invention.

Please refer to FIG. 1 and FIG. 2, wherein the four pieces of two-sectioned type of bolt sleeves 274 which extended out of the recoil body 27 formed the upper part which, after the upper cap has been sleeved, can be assembled by screw 10 and, at the same time, a compression spring 11 is also set therewith. A key button rod 6 is designed to pass through and project out of the upper cap 1 and the distance at which it passed through is restrained because it is being pressed against into the interior of the top seat 28 by the cushion ring 12, so that key button rod 6 will not, under the force exerted by the spring 61, be caused to move entirely out of the upper cap 1. Therefore, when the upper cap 1 is being slightly pressed to move downward, the recoil body 27 will be linking up to move downward as well. Because the slanted surface or slanting plane 264 locating at the top end of the latch or stop body 26 is being sleeved into the opening groove 273 of the recoil body 27, the stop body 26 will be caused to move to the right. At this time, the engaging portion of having an upward slanting shape on gang gear 62 which is set at the right edge of the key button rod 6 will, due to the moving of the stop body 26 toward the right, cause the latch edge or housing body 263 to move away from the gang gear 62, to the ultimate effect of causing the key button rod 6 to move upward.

Figure 5:
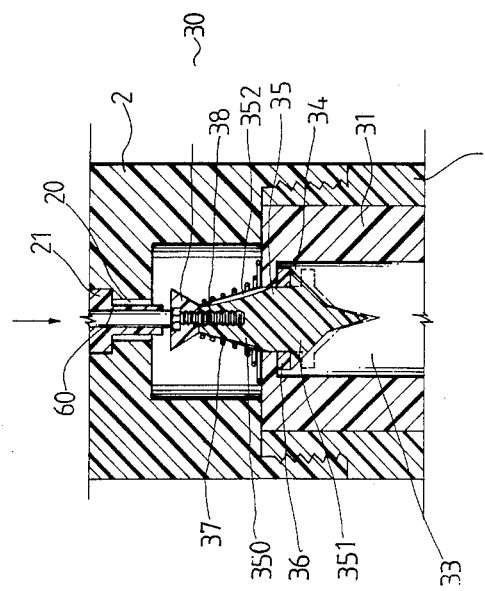
FIG. 5 is the cross-section drawing of the valve gate mechanism of the present invention.

Please refer to FIG. 1 and FIG. 5, wherein the bottom end of the middle cylinder body 2 is fixed with a curved cylinder 3 which is not having any upper space into which sleeve can be made. As indicated in FIG. 5, a tightening cushion ring 32 is set at the bottom end of the valve gate mechanism 30, which is capable of tightening the valve gate mechanism 30 at the time when the middle cylindrical body 2 and the curved cylinder 3 are being assembled. The forementioned valve gate mechanism 30 is having a positioning cylinder 31 to function as its main body, in the interior of which a circular aperture 33 is set and also having a valve gate 34 set therein which is comparatively smaller in dimension than that of the said circular aperture 33 to enable the upper part of the valve body 34 of circular awl sharp body 35 to be sleeve with and pressed against the valve gate 34 by a cushion ring 36, while the lower sharp body 351 will fall inside the circular aperture 33 of the positioning cylinder 31. Then, sleeve the awl shaped spring 37 into the upper valve body 350, also into which the awl cap 39 is tightly screwed by screw 38 to restrain the forementioned awl shaped spring 37. Therefore, when rod 60 is moving downward, the circular awl sharp body 35 will also be caused to move downward, so as to open the valve gate 34. The upper valve body 350 is of the design of an awl which is formed in an upward direction leaning toward an inward direction. Therefore, the more it moves downward, the greater the depth will become. Correspondingly, the valve gate will be opened more widely. In addition, several deep grooves 352 are set on the surface of the upper valve body 350 to increase the quantity of inlet water, so as to further enable the water to flow out by passing through the outlet pipe 4 which is sleeved to the lateral side of the middle cylindrical body 2.

Figure 6:
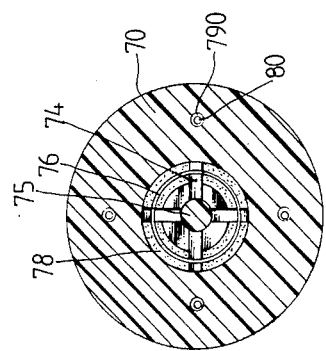
FIG. 6 is the looking downward corsssection view of the water quantity pressure reducing mechanism of the present invention.
Figure 7:
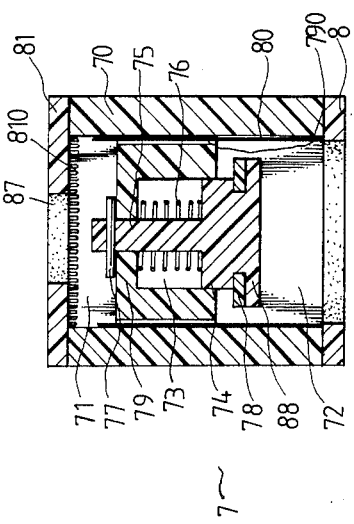
FIG. 7 is the cross-section view of the water quantity pressure reducing machanism of the present invention.

Please refer to FIGS. 6, 7 and 1, wherein a space is set at the bottom part of the curved cylinder 3, into which the water pressure reducing mechanism 7 can be set. The function of the forementioned mechanism is to reduce the water pressure to further reduce the resistance which rushed against the lower sharp body 351 of the valve gate mechamism 30, so as to make it easy for the circular awl sharp body 35 to move downward without producing any resistance when the key button rod 6 is being pressed down, to the ultimate effect of ensuring a smooth operation. Spaces 71, 72 are set in the upper and lower direction of a cylinder seat 70 in the interior of the forementioned water pressure reducing machanism 7. A circular aperture 73 is also set therewith in its central part which helped to form a straight rod 75 at the central of the cross-character base seat 74, into which a spring 76 is sleeved to further pass through and project out of and at the upper space 71. A horizontal aperture is also set at the top end of the straight rod 75, into which a circular pin 77 is horizontally inserted, so as to fix the said cross-character base seat 74. The bottom end of the cross-character base seat 74 is of the design of a circular disk 88, into which a cushion ring 78 is sleeved. Therefore, when the water pressure is excessively high, it will rush against the circular disk 88 and further cause the cross-character base seat 74 to move upward, so as to pevent the water from entering into the upper space 71. Again the central part of the cylinder seat 70 and the contact plane onto which the straight rod 75 is passing through and sleeved is also designed in the shape of a cross-character, but not in the shape of a circular disk. Therefore, the water will then be able to flow through the opening of the cross-character base seat 74 and further flow upward into the upper space 71. Although the cross-character base seat 74 will be caused to close when the water pressure is excessively high, the water will still flow up into the upper space 71 through another inlet, that is four through holes 790 are set in the ring body 79 which is located at the central part of the cylinder seat 70, through which the water will flow up into the upper space 71. However, the forementioned four through holes 790 are often found to be blocked by dirts brought by the water resulting from the passing through of water. Serving as a means to prevent such a defect from happening, a tightening cushion ring 8 is being employed to coordinate with the opposing four rods 80 made of soft material which are extended out of the four throught holes 790. When the water is flowing through the four through holes 790, the rod 80 which is made of soft material will be caused to oscillate, so as to get rid of the dirts. The buffer cushion ring 81 which is fixed at the upper end of the cylinder seat 70 is having a certain number of small convex bodies 810 set at its bottom plane, which is capable of buffering the flowing speed of the water. In this mammer, the water flow will first be biffered by the forementioned buffer cushion ring 81 and the tightening cushion ring 8 are also having the same function. That is to say, when the curved cylinder 3 is being screwed to the pipe connecting body 5, it will also be tightly fixed onto the cylinder seat 70 in the interior.

By referring to FIG. 1, it can be seen that, in the process to obtain the supply of water, all one has to do is to slightly press the key button rod 6. In so doing, the gang gear 62 set in the key button rod 6 will be assembled with the housing body 263 of the stop body 26, so as to stop the key button rod 6 from moving. The depth of pressing can be controlled and fixed at will. At the same time, rod 60 will also move downward to hasten the downward moving of the circular awl sharp body 35 to open the valve gate 34 and further enable the water to flow out through the water pipe 4. In the process of stopping the water from flowing out, just slightly press the upper cap 1 to cause the recoil body 27 to move downward, so as to further cause the stop body 26 to move toward the right hand side. At this time, the key button rod 6 will then move upward to close the valve gate 34.

I claim:

1. A key button water tap comprising:

a middle cylindrical body having an upper and a lower space respectively at its upper and lower ends, a ladder-shaped groove at its central part for receiving a laddershaped ring, a middle seat sleeved into the upper space, a convex cylinder positioned at a central part of the middle seat, and a positioning body at a right edge of the convex cylinder holding a latch by a mandrel passing through the latch into grooves in the positioning body, the latch extending upward to a top seat positioned on the middle seat, a recoil body being provided at the interior of the top seat, four two-sectioned bolt cylinders passing through the top seat, and a top cap being sleeved with the top seat and positioned at the upper end of the middle cylindrical body;

an upper cap being received on the upper end of the middle cylindrical body, a compression spring being interposed between the upper cap and the top seat for forcing them apart, screws passing through the two-sectioned bolt sleeves and fixing the upper cap to the recoil body of the middle cylindrical body, so that downward movement of the upper cap will cause the recoil body to move downward and permit recoil thereof by action of the compression spring;

a key button being located between the upper cap and the middle cylindrical body, the key button having a rod extending from the bottom thereof through a spring and then through the ladder-shaped cushion ring and into the lower space of the middle cylindrical body, a cushion ring being placed at a bottom plane of the top seat for preventing the key button from moving out of the top seat, a convex key is provided on a left side of the key button, the convex key exactly fitting within a opening groove located within the recoil body, a gang gear being provided at a right edge of the key button, the gang gear having engaging portions of an upward slanted shaped for engaging a latch edge of the latch and holding the key button temporarily in place;

a water outlet pipe being connected at a right edge of the middle cylindrical body for guiding water flow;

a curved cylinder being screwed onto the lower end of the middle cylindrical body, the curved cylinder having an upper and a lower space;

a valve gate mechanism being provided within the upper space of the curved cylinder, the valve gate mechanism having a positioning cylinder with a circular aperture within its interior, a valve gate comparatively smaller in dimension than the circular aperture being provided at a top end of the circular aperture for enabling an upper part of a circular awl sharp body with a cushion ring thereon to be pushed against the valve gate, a lower part of the awl sharp body being located within the circular aperture of the positioning cylinder, and an awl cap being screwed onto the upper end of the valve gate for restraining the awl-shaped spring, the upper part of the valve gate having an awl-shaped design narrowing in an upward direction with several deep grooves on its surface;

a water pressure reducing mechanism being provided at the lower space of the curved cylinder, the water pressure reducing mechanism having a cylindrical seat and an upper and a lower space respectively above and below the cylindrical seat, the cylindrical seat having a groove at its central position, a cross-character shaped ring being provided at an upper end of the circular groove, a straight rod extending out from a central position of a cross-character base seat through a spring and then through the cross-character shaped ring and projecting into the upper space of the cylindrical body, a horizontal aperture being provided at an end of the straight rod for accepting a circular pin for holding the cross-character base seat in position, a bottom end of the cross-character base seat having a shape of a circular disk and having a cushion ring being sleeved thereon, a buffer cushion ring and a coupling cushion ring being respectively provided at the upper and lower direction of the water pressure reducing mechanism for enabling the curved cylinder to operate by spiral motion conducted by the cylindrical body and to press tightly against the water pressure reducing mechanism;

wherein a supply of water is obtained by pressing the key button causing one of the engaging portions of the gang gear to engage the latch edge of the latch within the middle cylindrical body and causing the rod of the middle cylindrical body and the circular awl sharp body attached thereto to move downward together with the key button for opening the valve gate and releasing water from the water outlet pipe, the gang gear and the latch are arranged so that a deeper downward pressing movement of the key buttom causes a higher engaging portion of the gang gear to engage the latch edge thereby further opening the valve gate and increasing a quantity of water passing through the valve, and wherein closing of the valve gate is obtained by slightly pressing the upper cap thereby causing the recoil body to move downward and the latch to pivot to its right disengaging the latch edge from the engaging portion of the gang gear, so that the key button will move upward and close the valve gate.

2. The key button valve water tap as set forth in claim 1, wherein the latch has a circular aperture at its right edge for holding a spring pressed against an internal wall of the middle seat and a slanted surface extending from the latch edge upward and right, the slanted edge of the latch being housed in the opening groove of the recoil body and pressing against the opening groove.

3. The key button valve water tap as set forth in claim 1, wherein the buffer cushion ring at the upper end of the water pressure reducing mechanism is provided with several small convex bodies at its bottom end for slowing down water flow.

4. The key button valve water tap as set forth in claim 1, wherein four rods made of a soft material extend form the cushion ring of the water pressure reducing mechanism and pass through four holes within the central position of the cylindrical seat.

* * * * *